United States Patent [19]

Wareham

[11] 4,369,659

[45] Jan. 25, 1983

[54] PRESSURE TRANSDUCER

[75] Inventor: William M. Wareham, Marion, Mass.

[73] Assignee: Bofors America, Inc., Norwood, Mass.

[21] Appl. No.: 176,863

[22] Filed: Aug. 11, 1980

[51] Int. Cl.³ .......................... G01L 9/04; G01L 19/04
[52] U.S. Cl. ........................................ 73/708; 73/706; 73/726; 338/4
[58] Field of Search ................. 73/708, 706, 726, 727, 73/707, 715; 338/4

[56] References Cited

U.S. PATENT DOCUMENTS

| | | | |
|---|---|---|---|
| 1,832,380 | 11/1931 | Goldman | 73/706 |
| 1,898,257 | 2/1933 | Nelson | 73/707 |
| 3,128,628 | 4/1964 | Lebow | 73/726 |
| 3,349,623 | 10/1967 | Pastan | 73/726 |
| 3,645,136 | 2/1972 | Calhoun | 73/726 |
| 3,697,919 | 10/1972 | Orth et al. | 73/727 |
| 4,111,056 | 9/1978 | Mastromatteo | 73/706 |

*Primary Examiner*—Donald O. Woodiel
*Attorney, Agent, or Firm*—Wolf, Greenfield & Sacks

[57] ABSTRACT

The melt pressure transducer is preferably for use in pressure measurements associated with an injection molding machine, and is designed to be mounted inside a mold to measure cavity pressure directly. In addition to being small in size, the transducer is also adapted for high cycle life. The transducer utilizes an internal filler rod for temperature compensation and, also, to reduce liquid volume rather than a capillary. The strain gauges are secured to opposing flats of the housing to provide a pressure-ranged section. The housing is in the form of a thick-walled cylinder with the flats forming the sensitive areas. Further, a unique fill and seal technique is described for charging the transducer and, at the same time, pre-stressing the coupling diaphragm.

12 Claims, 5 Drawing Figures

U.S. Patent   Jan. 25, 1983   Sheet 1 of 2   4,369,659
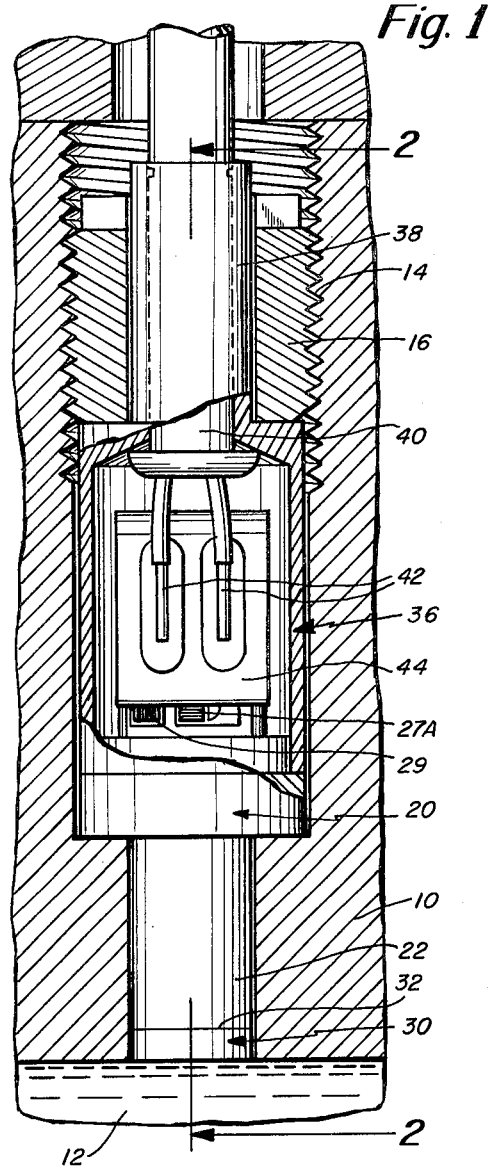
Fig. 1
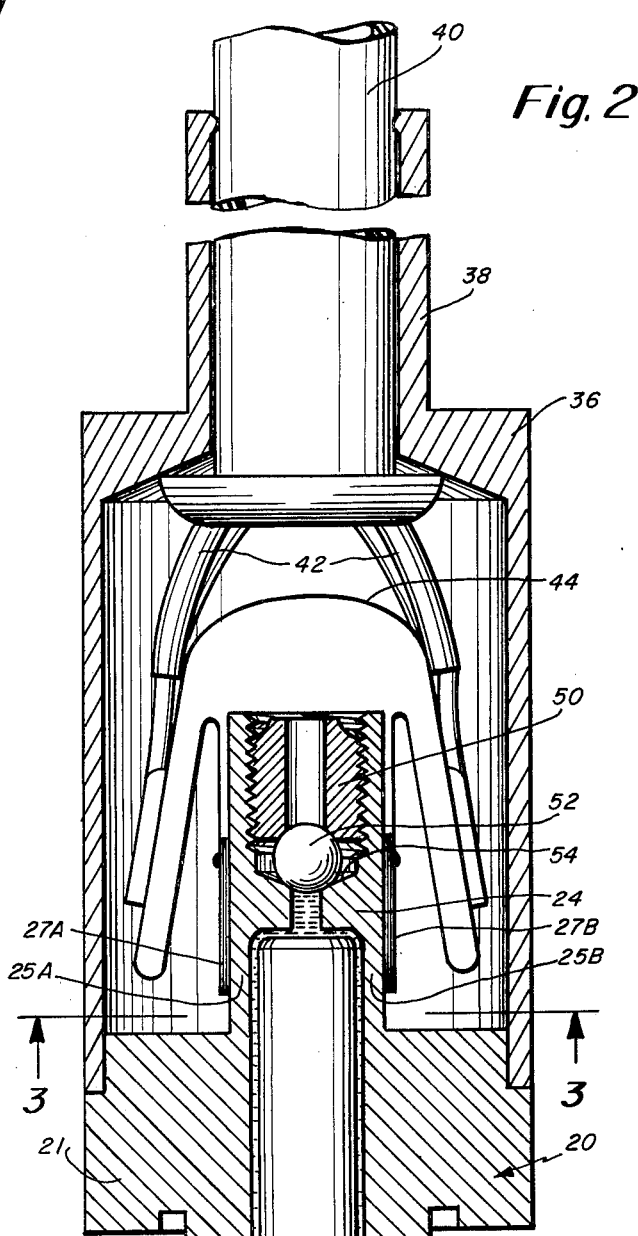
Fig. 2
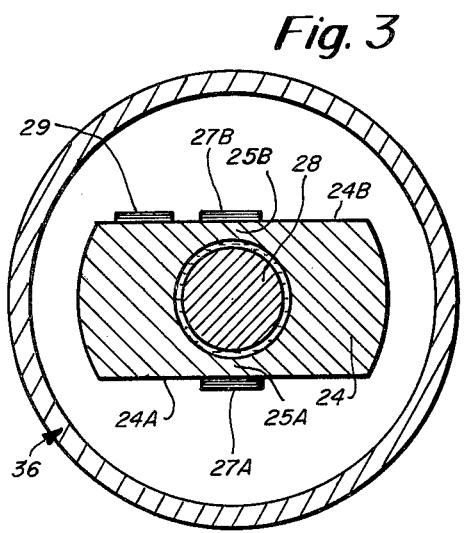
Fig. 3
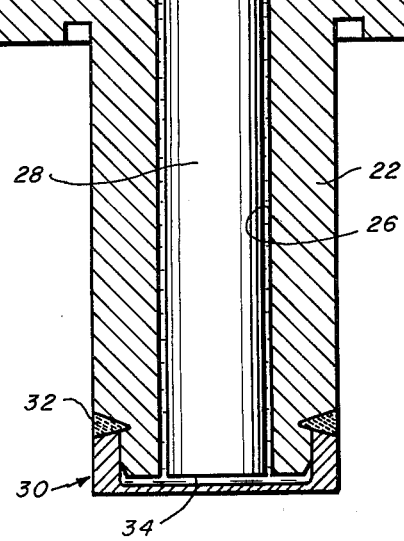

Fig. 4
Fig. 5
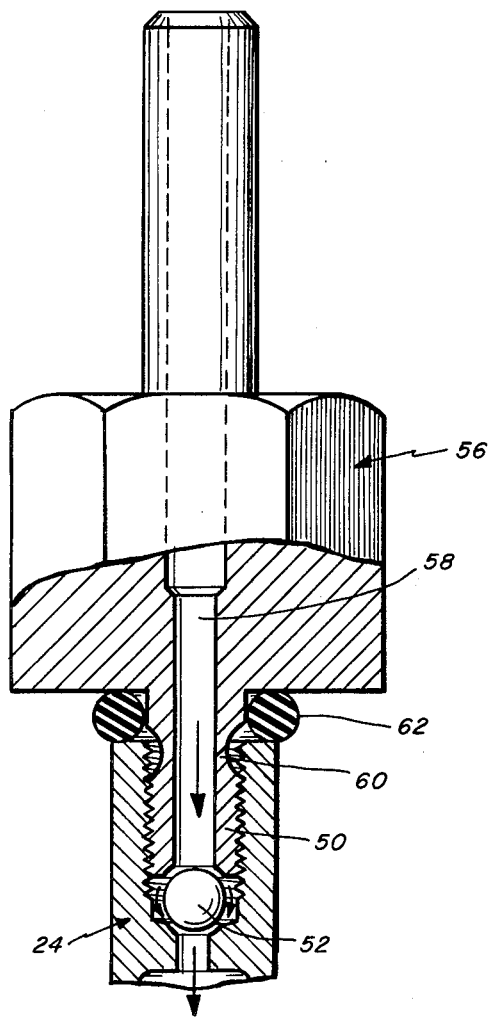
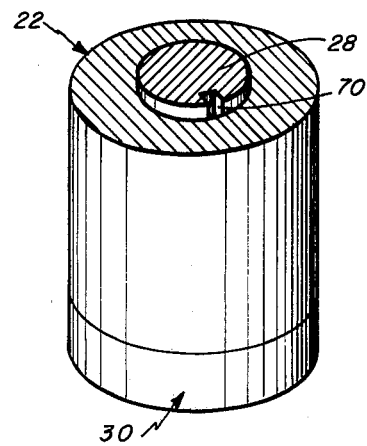

PRESSURE TRANSDUCER

BACKGROUND OF THE INVENTION

The present invention relates in general to pressure transducers and is concerned, more particularly, with a new and improved fluid-filled, direct sensing pressure transducer, the principles of which are particularly adapted for pressure sensing associated with an injection molding machine. The transducer of the present invention is characterized by a high cycle life and miniaturized size so as to permit cavity pressure measurements directly at the mold.

U.S. Pat. Nos. 3,349,623; 3,678,753, owned by the assignee herein, show fluid-filled pressure transducers. The transducers described in these patents, although useable in measuring pressures associated with various types of molding operations, are not readily adaptable as a pressure transducer for injection molding machines.

Accordingly, the primary object of the present invention is to provide a fluid-filled pressure transducer that is adapted for use with injection molding equipment. In comparison with the transducers described in the aforesaid patents, the transducer of this invention is of miniaturized size and designed to be mounted inside a mold to measure cavity pressure directly associated with an injection molding process.

A further object of the present invention is to provide an improved injection molding pressure transducer that is characterized by substantial fatigue resistance, thus, enabling high cycle life.

Still another object of the present invention is to provide an improved pressure transducer that is fluid filled and that has an improved sensing technique preferably employing a thick-walled cylinder configuration that minimizes overall working stress.

Another object of the present invention is to provide an improved fluid-filled pressure transducer that employs a filler rod for reducing the internal volume, thereby replacing the capillary arrangement as shown in the aforesaid patents. This replacement means a substantial ease in manufacture of the transducer. Furthermore, the use of a filler rod may be adopted as a vibration damper against resonances induced through transient pressure excitations.

Still a further object of the present invention is to provide an improved fluid-filled pressure transducer employing a minimum volume of fluid for reduced temperature effects.

Another object of the present invention is to provide an improved fluid-filled pressure transducer, preferably adapted for use with injection molding equipment and which is further characterized by an improved fill and seal mechanism. The transducer is preferably sealed under 100 p.s.i. line pressure applied through a hollow break-away fill screw which precharges the transducer and internally to 100 p.s.i. The filling technique also prestresses the coupling diaphragm, thus, reducing peak working tensile stresses by one the order of one half to significantly improve fatigue life of the transducer.

SUMMARY OF THE INVENTION

To accomplish the foregoing and other objects of this invention the pressure transducer of this invention is designed preferably for use with injection molding equipment, although, the principles defined herein may also be used for pressure measurements associated with other types of equipment wherein pressure measurements are taken. The pressure transducer described herein is of the fluid-filled type preferably using mercury as a fill. However, other liquid fills may also be employed herein. The transducer comprises a frame having an elongated cylindrical bore which terminates at one end adjacent one end of the frame. A coupler such as a diaphragm closes that end of the frame, while the other end of the frame defines a sensing area. The diaphragm is secured by a unique welding technique so that there is sufficient weld penetration to reduce working stress in that area. This also reduces the unwelded interface surfaces between the diaphragm and frame so as to minimize volume and further reduce stress. The elongated cylindrical bore accommodates a filler rod. This filler rod reduces the internal volume which is desired. The combination of the cylindrical bore with a filler rod essentially replaces the capillary employed in the prior art patents referred to herein. This arrangement provides a substantial ease in manufacture. This filler rod also provides thermal compensation by employing a low temperature coefficient material to offset the fluid fill whose temperature coefficient is large with respect to the preferred stainless steel body or frame. A rod material that may be used is sintered carbide, having a high modulus of elasticity, thus, reducing volumetric displacement over that of stainless steel. The sensitive areas to which strain gages may be attached are opposing flats machined from a thick-walled cylinder formed at the other end of the frame. The gaged section thereby formed provides a very efficient area for sensing and that furthermore minimizes internal fluid displacement under pressure. The sensing arrangement is designed to reduce stress concentrations around the portions of the frame leading to the sensitive area. These flats essentially form a concentrated sensing area surrounded and supported by the remaining thick-walled cylinder that reduces stress and furthermore reduces internal fluid displacement. Another aspect of the present invention is an improved fill and seal technique. The transducers are sealed under 100 p.s.i. line pressure applied through a hollow break-away fill screw which precharges the transducer internally to 100 p.s.i. There are at least two advantages of sealing under pressure. First, the pressure forces the internal fluid into all crevices and non-joined interfacing surfaces to thus reduce internal fluid displacement. Secondly, the internal pressure prestresses the coupling diaphragm, thus, reducing peak working tensile stresses by on the order of one-half to significantly improve fatigue life. The sealing screw is unique inasmuch as it is installed with the sealing ball before filling. After filling, it is then sealed by turning the screw under precharged pressure until it is torqued off leaving the unit sealed with a small threaded portion that is neat and tamper-proof.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a cross-sectional view of a preferred embodiment of pressure transducer constructed in accordance with the principles of this invention;

FIG. 2 is a cross-sectional view taken along line 2—2 of FIG. 1;

FIG. 3 is a transverse cross-sectional view taken along line 3—3 of FIG. 2;

FIG. 4 is a partial cross-sectional view for illustrating the filling and sealing technique of this invention; and FIG. 5 is a fragmentary partial view showing an alternate arrangement for the filler rod.

DETAILED DESCRIPTION

Referring now to FIGS. 1–3, there is shown one preferred embodiment of the invention, showing in FIG. 1 the mounting for the injection molding transducer. FIG. 1 shows the member 10 which illustrates a part of injection molding equipment having the injected mold material 12 associated therewith. The transducer is side-shaped as indicated in FIG. 1 and the member 10 is provided with an accommodating stepped bore shown threaded at 14. The transducer is secured in place by means of a threaded securing plug 16.

The transducer described herein may be provided in two alternate embodiments. In the embodiment described herein the transducer is end-filled. In an alternate arrangement the transducer is side-filled. The filling technique and the sealing of the transducer are discussed hereinafter with reference to FIG. 4.

The fluid-filled pressure transducer depicted in FIGS. 1–4 comprises a frame 20 having a snout end 22 and a sensing end 24. The frame 20 has an elongated cylindrical bore 26 that extends through the snout end 22, the main section of the frame, and terminates in the sensing end 24. The elongated cylindrical bore 26 accommodates the filler rod 28. The filler rod may have a diameter of 0.100 inch with the gap between the filler rod and the frame being on the order of 0.0010–0.0015 inch. Thus, the cylindrical bore 26 may be in the range of 0.102 inch to 0.103 inch. The tolerance between the filler rod and the frame, thus, provides for an extremely small volume fill therebetween.

The diaphragm 30 is preferably a stainless steel diaphragm welded at the very end of the snout end of the frame. The central diaphragm section of the device may have a thickness of 0.003–0.0035 inch. The diameter of the diaphragm may be in the range of 4–6 millimeters. FIG. 2 shows the preferred weld at 32 at the interface between the diaphragm and the snout end 22. This weld is preferably an electron beam or laser weld. It is noted that the weld extends the entire thickness t of the periphery of the diaphragm where the diaphragm attaches to the frame. The weld actually extends beyond the thickness t so as to provide a very secure attachment between the diaphragm and the frame. There is, of course, a small flat disc-shaped compartment 34 between the diaphragm and the frame and filler rod. As indicated previously, this is also of minimum volume. Of course, for the sake of clarity some of these dimensions are shown slightly enlarged over actual dimensions that are used. For example, the thickness of the diaphragm 30 and its central section is thinner than that illustrated in FIG. 2.

The mid-section 21 of the frame 20 has a peripheral shoulder for receiving the cover 36. The cover 36 also has a top end 38 for receiving the grommet 40. The grommet 40 may simply be a cylindrical piece of tubing for carrying conductor wires associated with the sensing portion of the transducer. The drawing shows these conductor leads 42 which are suitably secured to a connector terminal 44 which is in turn fastened suitably to the flates 24A and 24B of the sensing end 24. FIG. 3 clearly indicates the thick-walled portion of the sensing end 24 which is in the form of a thick-walled cylinder having flats 24A and 24B machined therein so as to form respective thin-walled areas 25A and 25B. It is noted in FIG. 3 that these sensing areas 25A, 25B have associated therewith sensing strain gages 27A and 27B, respectively. These may be conventional strain gages that are appropriately connected in a bridge circuit with the connections being made from the strain gages via the folding terminal strip to the conductor leads 42. See by way of example the bridge circuit depicted in U.S. Pat. No. 3,678,753. FIG. 3 also shows one of the inactive strain gages, namely strain gage 29 depicted in FIG. 3. The specific strain gage connection is not depicted herein as it is not considered as forming a part of the present invention. However, the overall sensing construction is considered to be an important aspect of the present invention. In this regard, reference is made in particular to the flats 24A and 24B provided in the sensing end. As mentioned previously, this is constructed from a thick-walled cylinder so as to minimize overall working stress and volumetric displacement. The active strain gages 27A, 27B preferably cover only the thinned down areas 25A and 25B thus making for a very efficient design. This gage section reduces any significant stress concentrations around the portions of the cylinder leading into the sensitive areas 25A, 25B. The sensing area is surrounded and supported by the thick-walled cylinder and this reduces stress and most importantly, reduces internal fluid displacement.

The filler rod 28 has been described previously. The use of a filler rod of this type is advantageous from a number of different standpoints. The filler rod, in combination with a very close tolerance bore in the frame, provides a substantially reduced internal volume which is desired. This construction essentially replaces the previous capillary arrangement such as used in U.S. Pat. Nos. 3,678,753 and 3,349,623. The arrangement of this invention, is manufactured with much greater ease than the capillary arrangement. Furthermore, the filler rod material is preferably selected to have thermal properties that temperature compensate the transducer for differential thermal expansion coefficients between the internal fluid which is preferably mercury and the main body of the transducer. It is preferred to have a low temperature coefficient expansion coefficient material to offset the fluid (liquid) fill which has a temperature coefficient which is large with respect to the stainless steel frame. The filler rod 28 material may be sintered carbide, having a high modulus of elasticity to assist in reducing volumetric displacement in comparison to that occurring when a stainless steel rod is used.

The filler rod 28 in the embodiment described is essentially floating in the device and tends to move up and down with the fluid as it is under high response pressures. There are substantially no shear forces generated between the rod and the fluid and, therefore, no energy is dissipated. Shock tests appear to show that ringing frequencies at high rates up to 30 KHz occur with some damping but the damping is not believed to be sufficient to provide any effective damping. In an alternate arrangement, the rod may be made not free floating and function more, thus, as a damper. In such an arrangement, the fluid would be moving between the wall of the body and the rod creating shear forces (stresses). The rod in an alternate embodiment could be pressfitted into the body with an edge slot to pass fluid down to the sensitive area. This would then provide some additional damping and may also be effective in further reducing fluid fill. FIG. 5 is a partial cross-sectional view showing such an arrangement of filler rod with the attendant slot 70 previously referred to.

Referring now to FIGS. 2 and 4, it is noted that the sensing end 24 is provided with a threaded aperture for receiving plug 50. In FIG. 2, the plug 50 is shown urged against a sealing ball 52 which is in turn forced against the seat 54 in the threaded aperture. The ball 52 on the seat 54 seals that end of the transducer. The transducer may even be force-filled and sealed prior to the attachment of the strain gages and associated terminal block.

The transducer is sealed under pressure and in the preferred embodiment is sealed under 100 p.s.i. line pressure applied through the hollow, break-away fill screw 56. As depicted in FIG. 4, the screw 56 has a hollow passage 58 through which the liquid (such as mercury) passes about the ball 52 and into the transducer chamber formed primarily about the filler rod. The filling, as indicated by the arrows in FIG. 4, occurs when the screw is not fully tightened against the ball. The fill position is illustrated in FIG. 4 where the ball is in a free position to permit the passage of fluid (liquid) thereby. Thus, in this position the fluid is passed through the passage 58 about the ball 52 and is forced into all crevices and non-joined interfacing surfaces to, thus, greatly reduce internal fluid displacement during operation of the transducer. Furthermore, the internal pressure prestresses the coupling diaphragm 30 thus reducing peak working tensile stresses by one half to significantly improve fatigue life of the diaphragm. The measurements made have shown that without this prestressing the diaphragm would be subjected to 200 p.s.i. pressure which develops high diaphragm tensile stresses that could result in poor fatigue life. This is overcome by the prestressing as previously mentioned. The sealing screw 56 along with the sealing ball 52 is installed before the filling operation takes place. Once the transducer has been filled, it is then sealed by turning the screw 56 under precharge pressure until until the screw is torqued off at the weakened area 60, leaving the plug 50 in place. This also makes for a neat and tamper-proof seal. An O-ring 62 may also be provided to prevent any leakage during filling.

Having described a preferred embodiment of the present invention, it is apparent that numerous other embodiments are contemplated as falling within the scope of this invention. One such alternate embodiment is depicted in FIG. 5. The liquid that is employed may be mercury as defined herein. However, in other arrangements where higher melting points are required, other fluids may be employed such as one with a 10° F. melting point such as one employing a eutectic alloy. Also, other high temperature non-metal liquid may be employed.

What is claimed is:

1. A pressure transducer comprising;
   a frame having an elongated bore therein extending from one end of the frame to another sensing end,
   a filler rod in the elongated bore and dimensioned in comparison with the bore dimensions to provide a minimum volume,
   a diaphragm closing the one end of the frame and defining with the frame a compartment in communication with the bore,
   a liquid filled deformable sensor defined at the sensing end of the frame including a reduced thickness wall surrounded by thicker wall portions and sensing means at the reduced thickness wall for sensing deformation of the diaphragm,
   and a liquid filling the transducer for applying pressure exerted against the diaphragm to the sensing means,
   said filler rod extending substantially the entire length of said bore from said liquid filled deformable sensor to the diaphragm defined compartment,
   said diaphragm defined compartment being thin and disc-shaped and also defined by at least an end of the filler rod,
   said filler rod being constructed of a material having a low temperature coefficient of expansion in comparison to that of the liquid fill and said filler rod extending from said sensing end of the frame to the diaphragm compartment,
   said filler rod in combination with a close tolerance bore in the frame providing a small internal liquid volume.

2. A pressure transducer as set forth in claim 1 wherein said bore is cylindrical to correspond with a cylindrical filler rod.

3. A pressure transducer as described in claim 1 wherein the gap between the filler rod and the frame is on the order of 0.0010–0.0015 inch.

4. A pressure transducer as set forth in claim 1 wherein the diaphragm includes a metal diaphragm welded at its periphery to the frame.

5. A pressure transducer as set forth in claim 4 including an electron beam welding technique for securing the diaphragm.

6. A pressure transducer as set forth in claim 1 wherein the reduced thickness wall is formed by a flat on a thick-walled cylinder forming the sensing end of the frame.

7. A pressure transducer as set forth in claim 6 including opposing flats on the thick-walled cylinder to form opposing reduced thickness walls.

8. A pressure transducer as set forth in claim 7 including strain sensing means secured to the outside of the frame at the reduced thickness walls to measure the wall deformation.

9. A pressure transducer as set forth in claim 1 wherein the frame includes means for receiving the liquid fill including a plug sealing against a ball.

10. A pressure transducer as set forth in claim 1 wherein said filler rod fits tightly into the elongated bore but having passage means to permit fluid communication between ends of the filler rod.

11. A pressure transducer as set forth in claim 1 wherein the filler rod is cylindrical having a diameter on the order of 0.100 inch with the cylindrical bore for the filler rod being in the range on the order of 0.102–0.103 inch.

12. A pressure transducer as described in claim 1 wherein said disc-shaped compartment is further defined by an end wall of the frame adjacent the filler rod end.

* * * * *